United States Patent
Evans et al.

(10) Patent No.: US 6,854,046 B1
(45) Date of Patent: Feb. 8, 2005

(54) CONFIGURABLE MEMORY MANAGEMENT UNIT

(75) Inventors: Marc A. Evans, San Jose, CA (US); Earl A. Killian, Los Altos Hills, CA (US); Pavlos Konas, Mountain View, CA (US)

(73) Assignee: Tensilica, Inc., Santa Clara, CA (US)

( * ) Notice: Subject to any disclaimer, the term of this patent is extended or adjusted under 35 U.S.C. 154(b) by 233 days.

(21) Appl. No.: 10/213,370

(22) Filed: Aug. 5, 2002

Related U.S. Application Data (60) Provisional application No. 60/310,032, filed on Aug. 3, 2001.

(51) Int. Cl.[7] .............................................. G06F 12/00
(52) U.S. Cl. ....................................... 711/203; 711/207
(58) Field of Search .................... 711/1, 3, 6, 202–207; 717/100–101, 121; 703/21; 716/17

(56) References Cited

U.S. PATENT DOCUMENTS

| | | | |
|---|---|---|---|
| 5,479,630 A | 12/1995 | Killian ........................... 711/3 |
| 5,826,057 A * | 10/1998 | Okamoto et al. ............. 703/24 |
| 6,374,342 B1 * | 4/2002 | Sasahara ...................... 711/207 |
| 6,418,520 B1 * | 7/2002 | Hayakawa et al. .......... 711/203 |
| 6,732,250 B2 * | 5/2004 | Durrant ....................... 711/202 |
| 6,763,327 B1 * | 7/2004 | Songer et al. ................ 703/21 |
| 2003/0204830 A1 * | 10/2003 | Brawn et al. ................. 716/17 |

* cited by examiner

*Primary Examiner*—Nasser Moazzami
(74) *Attorney, Agent, or Firm*—Pillsbury Winthrop LLP (57) ABSTRACT

An MMU provides services at a cost more directly proportional to the needs of the system. According to one aspect, the MMU provides both address translation and sophisticated protection capabilities. Translation and protection are desirable when applications running on the processor are not completely debugged or trustable, for example. According to another aspect, a system for configuring the MMU design according to user specifications and system needs is provided. The MMU configurability aspects enable the system designer to configure MMUs having run-time programmability features that span the range from completely static to completely dynamic. In addition, the MMU can be configured to support variable page sizes, multiple protection and sharing rings, demand paging, and hardware TLB refill, for example.

34 Claims, 5 Drawing Sheets

CONFIGURABLE MEMORY MANAGEMENT UNIT

CROSS-REFERENCE TO RELATED APPLICATIONS

The present application is based on, and claims priority from, U.S. provisional application No. 60/310,032, filed Aug. 3, 2001, commonly owned by the present assignee, the contents of which are incorporated herein by reference.

BACKGROUND OF THE INVENTION

1. Field of the Invention

The present invention is directed toward digital computing systems. More particularly, it is directed to memory management units for digital processors and the like.

2. Background of the Related Art

Caches, Translation Lookaside Buffers (TLBs) and memory management units (MMUs) are ubiquitous in microprocessor design. For general information on such microprocessor structures and management schemes, see J. L. Hennessy and D. A. Patterson, *Computer Architecture: A Quantitative Approach* (1996), Chapter 5. Generally, the speed at which a microprocessor (e.g. a CPU or processor core) operates depends on the rate at which instructions and operands can be transferred between memory and the CPU. A related issue is how efficiently the space in memory can be used. A memory management design including structures such as those listed above should be capable of allowing a system designer to address at least these issues.

Figure 1:
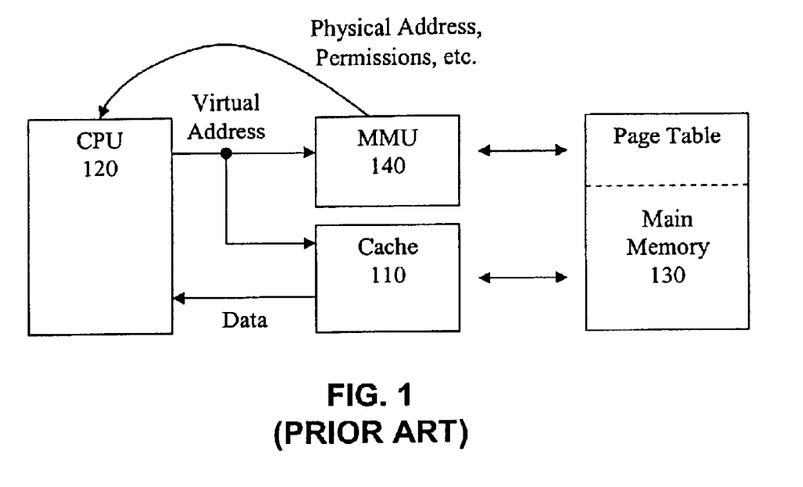
FIG. 1 is a top-level diagram illustrating a conventional cache and MMU.

Referring to the processor system illustrated in FIG. 1, cache 110 is a relatively small but fast random access memory (RAM) used to store a copy of at least a portion of main memory 130 in anticipation of future use by the CPU 120. Accordingly, the cache 110 is positioned between the CPU 120 and the main memory 130 (which can also be implemented by slower RAM) as shown in FIG. 1, to intercept calls from the CPU 120 to the main memory 130. When data from memory is needed by a program executing on CPU 120, it can quickly be retrieved from the cache 110, rather than from the slower main memory 130.

A memory management unit (MMU 140) is a hardware component that manages a virtual memory system by, for example, translating virtual addresses into physical addresses for accessing data or program memory in accordance with the needs of a program executing on a processor (see the Hennessy and Patterson reference above). Typically, the MMU is part of CPU 120. However, in some designs it is a separate chip. MMU 140 is shown separately from CPU 120 in FIG. 1 for ease of illustration.

The MMU typically includes a small amount of fast memory that holds a translation lookaside buffer (TLB) for caching a portion of the page table (which may or may not be stored in main memory 130). Attempted accesses to data in memory by programs executing on CPU 120 are sent to MMU 140 and cache 110. In return for the virtual address from the CPU, cache 110 will provide the requested data and MMU 140 will provide the corresponding physical address. In case of a cache 110 hit, the CPU 120 will use the data supplied by the cache 110. In case of a cache 110 miss, CPU 120 will use the translated physical address to retrieve the data from memory 130.

In general, caches can be indexed (address portions used to find an entry) and tagged (address portions used to compare an entry) as follows: (1) physical (i.e. translated) index, physical tag; (2) virtual (i.e. un-translated) index, virtual tag; and (3) virtual index, physical tag. A disadvantage of the physical index, physical tag scheme is that the MMU needs to perform translation before cache access can begin. In the virtual index, virtual tag scheme, although the MMU translation is not needed before cache access, the cache must be properly purged upon any change to the page table. In the virtual index, physical tag scheme, the MMU and cache access can begin in parallel, but tag comparison requires the physical (i.e. translated) address from the MMU. Although the invention described in detail herein will refer to a virtual index, physical tag scheme, those skilled in the art will be able to apply the teachings of the invention to other schemes as well.

The TLB in MMU 140 is typically organized to hold only a single entry per cache index (e.g. a portion of the virtual address), wherein each TLB entry comprises, for example, a physical page number, permissions for access, etc. In contrast, cache 110 is typically organized into a plurality of blocks, wherein each block has a corresponding tag (e.g. a portion of the virtual address) and stores a copy of one or more contiguously addressable bytes of memory data. It should be noted that there may be separate caches for instructions and data from main memory (i.e. I-Cache and D-Cache), and correspondingly separate TLBs. However, such additional details are not shown in FIG. 1 for ease of illustration.

In addition to translating the physical address into the corresponding virtual address for the desired memory data, MMU 140 will also determine whether the page corresponding to the desired virtual address is in memory 130 or whether the page needs to be fetched from secondary storage (typically, a larger but slower memory such as a hard disk). To accomplish this, each entry in the page table (and TLB) typically includes a valid/invalid bit that distinguishes whether or not the corresponding page is in memory 130. If the program tries to access a page that is not in memory 130 as indicated by its valid/invalid bit being set to invalid, MMU 140 generates a page fault which traps to the operating system also executing on CPU 120. Typically, the operating system then chooses a page frame to replace in memory 130 based on frame usage patterns and writes its contents from memory 130 back to secondary storage. It then fetches the page that was just referenced from secondary storage and inserts it into the freed page frame in memory 130. The valid/invalid bit of the entry in the page table corresponding to the replaced page is cleared (i.e. set to invalid) and that of the newly fetched page is set to valid. It should be noted that entries in the page table (i.e. PTEs) can also include a "dirty bit" that indicates whether the page has been written to by the processor. A page that is not "dirty" can be replaced without writing it back to secondary storage.

Figure 2:
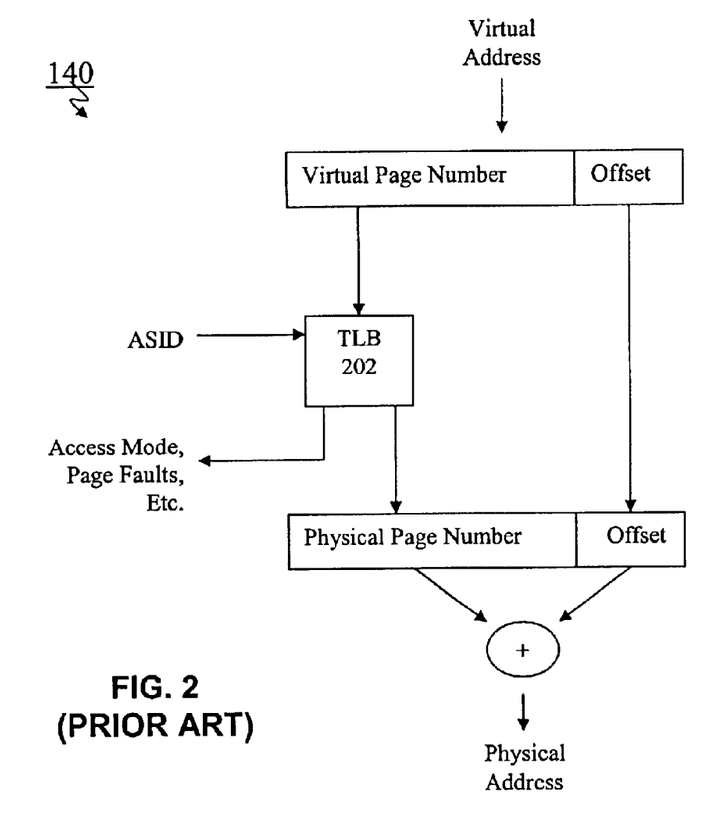
FIG. 2 is a functional diagram illustrating a conventional MMU in more detail.

FIG. 2 shows an example operation of MMU 140 in more detail. Generally, the virtual address space (the range of $2^{(M+N)}$ addresses used by the processor) is divided into pages, each of which has a size of $2^N$ words (ranging from a few kilobytes to several megabytes). The bottom N bits of the address designate the offset within a page and are left unchanged. The upper M address bits indicate the virtual page number. The MMU 140 contains a TLB 202 which is indexed (possibly associatively) by the virtual page number. As mentioned above, each page table entry (PTE) cached in TLB 202 gives the physical page number corresponding to the virtual one. This is combined with the page index to give the complete physical address. It should be noted that the physical page number need not comprise the same number of bits as the virtual page number. As shown in FIG. 2, the virtual page number may also be combined with an address space identifier (ASID) as a further way to index TLB 140 in accordance with protection and access schemes that are known in the art, and will be described in more detail hereinbelow.

To further illustrate by example, with a page size of 4K (i.e., $2^{12}$) and 16 bit addresses, the virtual address is split into a 4 bit page number and a 12 bit offset. With 4 bits for the page number, it is possible to represent 16 pages, and with 12 bits for the offset, all 4096 bytes within the page can be accessed. As set forth above, a PTE may also include information about whether the page has been written to, when it was last used (e.g. for a replacement algorithm employed by an operating system to determine which page to replace upon a page fault), what kind of processes may read from and write to it (i.e. user mode, supervisor mode, permissions, access modes, etc.), and/or whether it should be cached and how (e.g. allocate, write-back, write-through, etc.).

As is known, there are different types of caches, ranging from direct-mapped caches, where a block can appear in only one place in the cache, to fully-associative caches where a block can appear in any place in the cache. In between these extremes is another type of cache called a multi-Way set-associative cache wherein two or more concurrently addressable RAMs can cache a plurality of entries for a single cache index. That is, in a conventional N-Way set-associative cache, the single cache index is used to concurrently access a plurality of entries in a set of N RAMs. The number of RAMs in the set indicates the number of Ways for the cache. For example, if the cache index is used to concurrently address entries stored in two RAMs, the cache is referred to as a two-Way set-associative cache. Although not shown in detail in FIG. 2, TLB 202 can also be implemented using a range from direct-mapped to fully associative types of caches.

In case of a cache miss (in cache 110 and/or TLB 202), a determination is made to select one of the blocks/entries for replacement. Methods of implementing a replacement strategy for data in a cache are known in cache design. Typically, the replacement of cache entries is done in a least recently used (LRU) manner, in which the least recently used block is replaced. A more flexible strategy is the not most recently used (NMRU) approach, which chooses a block among all those not most recently used for replacement. Blocks may also be selected at random for replacement. Other possible strategies include pseudo-LRU (an approximation of true-LRU that is more easily implemented in hardware), Least Recently Filled, and clock algorithms similar to those used by software for managing the replacement of pages in a page table.

Although the above described features of MMU 140 are valuable in microprocessor design, they face some limits in terms of functionality. That is, being a hardware component, once an MMU is designed, its functionality is fixed and associated circuitry implements that design. It would be desirable if the same basic MMU design was configurable so that in a configurable processor system, for example, the MMU could be configured along with the rest of the processor circuitry. For example, it would be desirable to configure a MMU according to such design parameters as page size, associativity, number of ways in the TLB, the number and types of bits for protection schemes and access modes, and independent design of ITLBs and DTLBs based on a common set of parameters.

U.S. patent application Ser. No. 09/246,047 (TEN-001), commonly owned by the present assignee, the contents of which are incorporated herein by reference, dramatically advanced the state of the art of configurable processors. The system described in that application includes a user interface and a build system for defining a configurable and extensible processor based on user selections, complete with software development tools for creating and debugging software for executing on the defined processor.

Although the above invention allows many aspects of the processor to be configured to the user's specifications, the MMU of the processor can not be directly configured. Such configurability could allow the MMU to provide its services at a cost more directly proportional to the needs of the system. For example, many embedded processor systems use a static memory map known at system design time. Using a run-time programmable MMU in these systems is wasteful in gates and power. Conversely, more general-purpose processor systems require runtime programmability because a diverse set of applications run on these systems and no one static choice could satisfy all of their requirements. It would be desirable to allow the system designer to configure MMUs having run-time programmability that spans the range from completely static (i.e. more suitable for typical embedded processor systems) to completely dynamic (i.e. more suitable for typical general-purpose processor systems). For example, MIPS and x86 are general purpose processors that have MMUs with fixed numbers of TLB entries and fixed features such as demand paging, which features could be wasteful for embedded applications. In addition, it would be desirable if the processor's MMU could support such options as variable page sizes, multiple protection and sharing rings, demand paging, and hardware TLB refill.

One way to provide a configurable MMU in a processor such as that made possible by the above-identified application would be to separately generate it as a Verilog or VHDL module. Such a module would allow the processor would hand the MMU a virtual address, and the MMU would hand back a physical address and the access modes. This would require, however, designing an efficient way to do the translation, i.e., what circuits to use, and also understanding all the implications of fitting this module into the processor pipeline, how to raise exceptions, and so forth.

One possible way around this would be to allow system designers to specify their translation in the TIE language developed by Tensilica, Inc. of Santa Clara, Calif., and then a TIE compiler-like tool could integrate it with the base processor design. It would be more desirable, however, to provide a more purely configurable approach. It would be further desirable to identify a set of configuration parameters that could specify almost everything one might want to do with an MMU. Given that configurability is simpler than extensibility, when it does the job it should be used. The parameters used in the MMU should be portable to a wide variety of implementations. Thus, software using a particular MMU configuration could run on a variety of processor implementations or generations.

SUMMARY OF THE INVENTION

The present invention provides a memory management unit (MMU) design that is configurable and can be used in a configurable processor system. According to one aspect, an MMU configured according to the invention provides both address translation and sophisticated protection capabilities. Translation and protection are desirable when applications running on the processor are not completely debugged or trustable, for example. The present invention also provides a system for configuring the MMU design according to user specifications and system needs. According to one aspect, the MMU configurability aspects of the present invention enable the system designer to configure MMUs having run-time programmability features that span the range from completely static to completely dynamic. In addition, the MMU can be configured to support variable page sizes, multiple protection and sharing rings, demand paging, and hardware TLB refill, for example.

BRIEF DESCRIPTION OF THE DRAWINGS

These and other aspects of various embodiments of the present invention will become apparent to those skilled in the art by reading the following detailed description of the preferred embodiment, which, taken in conjunction with the accompanying drawings, teach those skilled in the art how to practice the best mode of the invention, and in which.

DETAILED DESCRIPTION OF PRESENTLY PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future equivalents to the known and novel components referred to herein by way of illustration, and substitution into the example embodiments with such equivalents are to be considered alternative embodiments of the invention.

Generally, the present invention provides a fully configurable MMU design, as well as a system for configuring a MMU for a processor system based on that design, in which the MMU's cost in terms of number of gates, power consumption and hardware functionality are more directly proportional to the needs of the processor system. According to one aspect, the MMU configurability features of the present invention allow system designers to configure MMUs based on a common design that span the range from completely static (e.g. suitable for typical embedded processor systems) to completely dynamic (e.g. suitable for typical general-purpose processor systems) run-time programmability. According to further aspects, the MMU can be optionally configured to support such enhanced features as variable page sizes, multiple protection and sharing rings, demand paging, and/or hardware TLB refill, for example.

Figure 3:
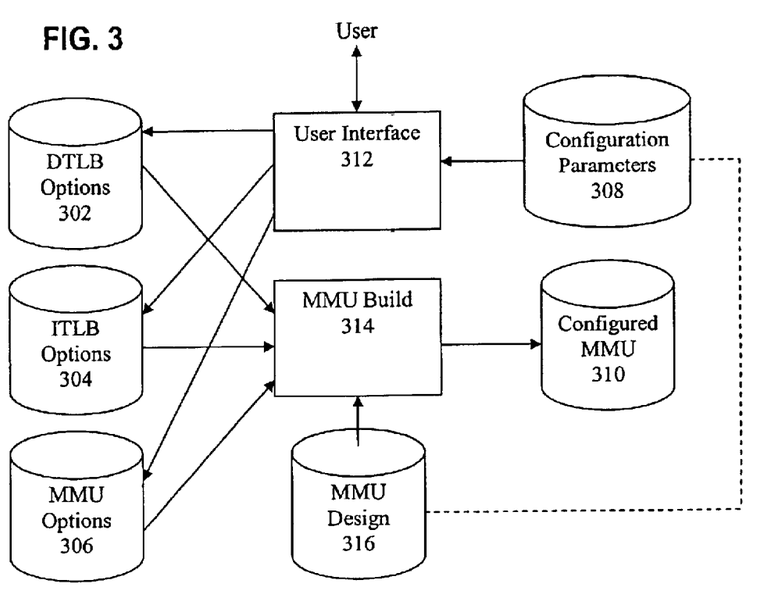
FIG. 3 is a top-level diagram illustrating a system for configuring a MMU in accordance with an example of the invention.

As shown in FIG. 3, system designers configure the MMU 310 by specifying various configuration options (302–306) based on pre-determined parameter values 308. The set of parameters 308 is chosen to provide sufficient flexibility for diverse needs, without requiring knowledge of the processor implementation. According to one aspect of the invention, the set of configuration parameters allows system designers to configure MMUs that span the range from completely static to completely dynamic run-time programmability, and that can support such enhanced features as variable page sizes, multiple protection and sharing rings, demand paging, and/or hardware TLB refill, for example. According to a further aspect, the parameters are intended to be portable to a wide variety of implementations, such that software using a particular MMU configuration can run on a variety of implementations or generations of processors.

User interface 312 and MMU build 314 can be implemented by mechanisms such as those described in U.S. application Ser. No. 09/246,047 (TEN-001). Generally, the mechanisms of user interface 312 can include a graphical user interface program (e.g. a program having control boxes, drop-down lists and other controls running on a Windows operating system or web browser) that displays to a user certain configuration options represented by configuration parameters 308 and allows the user to select certain values of the parameters to specify desired options 302 for a data TLB (DTLB), options 304 for an instruction TLB (ITLB), and options 306 for overall memory management and/or MMU functionality. The mechanism may further include the ability to specify default options. An example of the possible sets of configuration parameters 308 will be described in more detail below. It should be noted that, although shown separately for clarity of the invention, the functionality of user interface 312 and MMU build 314 may be provided in separate or common execution modules, including modules having other functionality not necessary for an understanding of the present invention as will be apparent to those skilled in the art.

The selected and default (if no others were selected) options (i.e. declarations) are used by MMU build 314 to generate a configured MMU 310 according to the options 302–306. MMU build 314 can include a mechanism such as a pre-processor that generates a program containing Verilog embedded in Perl code for generating a configured MMU based on the MMU design 316. To implement the configurability of the MMU, the options 302–306 are provided in a Perl data structure which represents the various configuration parameters of the design 316. The configured MMU is then generated by the Perl program which in turn generates a hardware description. For example, the Perl code generates hardware in the form of a hardware description language (HDL) based on the configuration parameters 308 represented in options 302–306 and tied to the MMU design 316. An example of Perl code that can be used in accordance with the above-described mechanisms is included in the provisional application No. 60/310,032 incorporated herein by reference.

In one example, the configured MMU is implemented in a hardware description language (HDL) such as Verilog or VHDL. The HDL can then be synthesized into actual hardware with a CAD tool such as Synopsys Design Compiler. The following steps illustrate how the HDL can be generated from the configuration parameters 308 of the MMU design 316:

1. The configuration parameters are represented in a Perl database structure.
2. The HDL for the TLB(s) is generated. Since ITLBs and DTLBs can be almost identical structures, a preferred embodiment of the present invention generates either or both from the same source of design 316, with just different configuration parameters 308. The robustness of the configuration parameters allows for an MMU to be configured with separate ITLBs and DTLBs that are vastly different from each other. For example, a small program that makes use of a lot of data may require only require a statically mapped ITLB, but a DTLB that has many pages which can AutoRefill.
3. Control logic for the MMU is generated based on the configuration of the TLB(s).
4. Finally, HDL modules are created to wrap the TLB(s). The primary purpose of this is to make the basic TLB structure as implementation and pipeline independent as possible to allow it to be ported to multiple processor generations.

According to an aspect of the invention that is referred to above, and will become more apparent from the descriptions below, the configuration parameters 302 are related to, and in large part determined by, the overall MMU design 316. For example, the options 302–306 specified according to the pre-defined set of parameters 302 can describe the number of ways and the degree of associativity of the TLB(s), as well as the page size(s) supported thereby. As another example, options 302–306 can describe how the physical addresses, protection checks, and access modes are retrieved from the virtual addresses used to access TLBs (and optionally a page table) and provided to the MMU. Given this level of configurability, some MMUs can be configured that do not support address translation, while others would support address translation. A fully configurable MMU according to the invention is intended to support a broad range of translation schemes.

Figure 4:
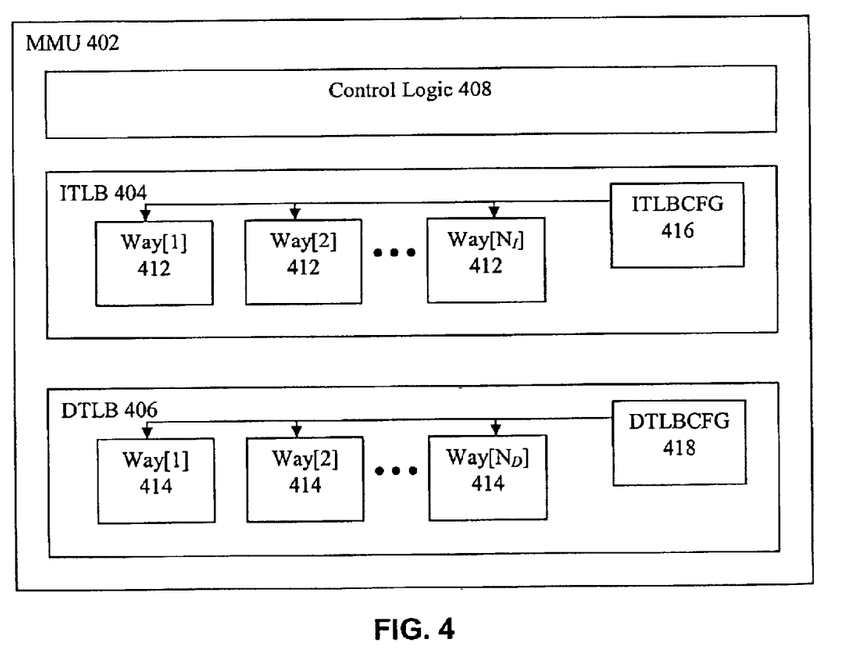
FIG. 4 is a top-level diagram illustrating a configurable MMU in accordance with an example of the invention.

FIG. 4 illustrates a MMU 402 implemented in accordance with an example of MMU design 316. As shown in FIG. 4, in this example, the MMU design supports virtual to physical address translation via a separate Instruction TLB (ITLB) 404 and Data TLB (DTLB) 406. That is, one TLB handles address translation for instruction storage and another TLB handles address translation for data storage, respectively. As further shown in FIG. 4, each TLB in this example can be separately configured to have different numbers $N_1$ and $N_D$ of ways W[1] to W[$N_1$] 412 and W[1] to W[$N_D$] 414, respectively, with each way possibly having different numbers of entries (i.e. the MMU design supports heterogeneous ways), as will be described in more detail below.

As further shown, MMU 402 includes control logic 408, ITLB 404 includes configuration register ITLBCFG 416 and DTLB 406 includes configuration register DTLBCFG 418. Generally, control logic 408 controls the overall operation of MMU 402, including operations in accordance with some of the overall MMU configuration parameters. The configuration registers are implemented according to the configuration selected for the TLBs and provide run-time parameters that can be programmed by an operating system. The functionalities of control logic 408, ITLBCFG 416 and DTLBCFG 418 will become more apparent from a detailed description of their structures below, as well as the detailed descriptions of TLBs 404, 406.

Although based on a common design, in a preferred embodiment, the Instruction and Data TLBs can be configured independently for most parameters. This is appropriate because the instruction and data references of processors can have fairly different requirements. For example, instruction accesses tend to be much more local than data accesses. Processors usually execute sequentially until a branch, and the branch is often within the same page as its target. So, for example, a smaller number of entries might be appropriate for an Instruction TLB. Data accesses, on the other hand, sometimes exhibit a high degree of locality when a program accesses packed structures such as arrays, and sometimes less locality when they access dynamic structures such as linked lists.

Additionally, independent configuration of the Instruction and Data TLBs is useful because in some systems additional flexibility may be appropriate on one but not the other. However, when the two TLBs both refill from a common page table in memory, the associated parameters should be shared. One example of this is the shared PTEPageSizes configuration parameter that will be described in more detail below.

Because the two TLBs can be generated in generally the same manner, the TLB hardware will only be described in detail herein only once. The differences between the generated ITLB and DTLB is accomplished by differing the configuration parameters that relate separately to them. For instance, Tlb<ConfigurationParameter> is used to specify the configured generation of a single TLB. However, by having two parameters, InstTlb<ConfigurationParameter> and DataTlb<ConfigurationParameter>, and using the generic TLB generator, vastly different instruction and data TLBs can be generated for use in the same processor. This is particularly useful, since different applications may have entirely different needs in terms of instruction memory and data memory as mentioned above.

As one example, ITLB 404 and DTLB 406 may, in some configurations, be refilled by hardware from a common page table structure in memory. In other configurations, both TLBs may be self sufficient for their translations, in which case no page tables in memory are required. Accordingly, the MMU design of the preferred embodiment can support operating with or without a page table in main memory depending on how they are configured. With a page table in main memory, certain ways of the TLB can be configured for AutoRefill, and can provide selective refilling and caching of page table entries (PTEs), as will be described in more detail below. Without a memory page table, the run-time address space is whatever software loads into the TLB. Although "TLB" is conventionally an acronym for Translation Lookaside Buffer (i.e. just a storage element for buffered entries), the term TLB in the present disclosure will refer to the address translation hardware in general, as will become more apparent below.

As will be described in more detail below, the TLBs in a preferred embodiment operate using three pipelined cycles. The Address (A) cycle is when the virtual address is presented to the TLB. The Translation (T) cycle is where the TLB performs all of its lookup, comparisons, and exception detection. The Update (U) cycle is when any values that need to be written to the TLB are actually updated.

TABLE 1 below lists an example set of configuration parameters (provided in parameters 308, for example) for specifying the overall generation of each TLB.

TABLE 1

| TLB Configuration Parameter | Description | Example Value |
|---|---|---|
| xTlbWayCount | Number of Ways in the TLB (i.e., $N_I$ and $N_D$) | 1 |
| xTlbVAddrBits | Number of virtual address bits used by the TLB | 32 |
| xTlbPAddrBits | Number of physical address bits used by the TLB | 32 |
| ImplxTlbBuildingBlock | Whether to build the TLB storage elements from latches or flip-flops | Latch |

Note: These parameters can be specified for each TLB; therefore, X in the above parameters can be either "Data" or "Instruction".

Most of the above parameters are self-explanatory. As for the parameter ImplxTlbBuildingBlock, it should be noted that the largest logic area of the MMU could potentially be comprised by the storage elements of the TLBs. Accordingly, in one example of the invention, these can either be configured to be implemented in standard cell flip-flops or latches. Latches are typically chosen for their smaller area, but make SCAN more difficult, since they must be put in a transparent state during SCAN testing.

It should be noted that some hardware descriptions that are specific for the Data TLB and/or Instruction TLB can be generated in addition to the hardware descriptions that are automatically generated based on the configurations for the overall TLB module as described above.

Figure 5:
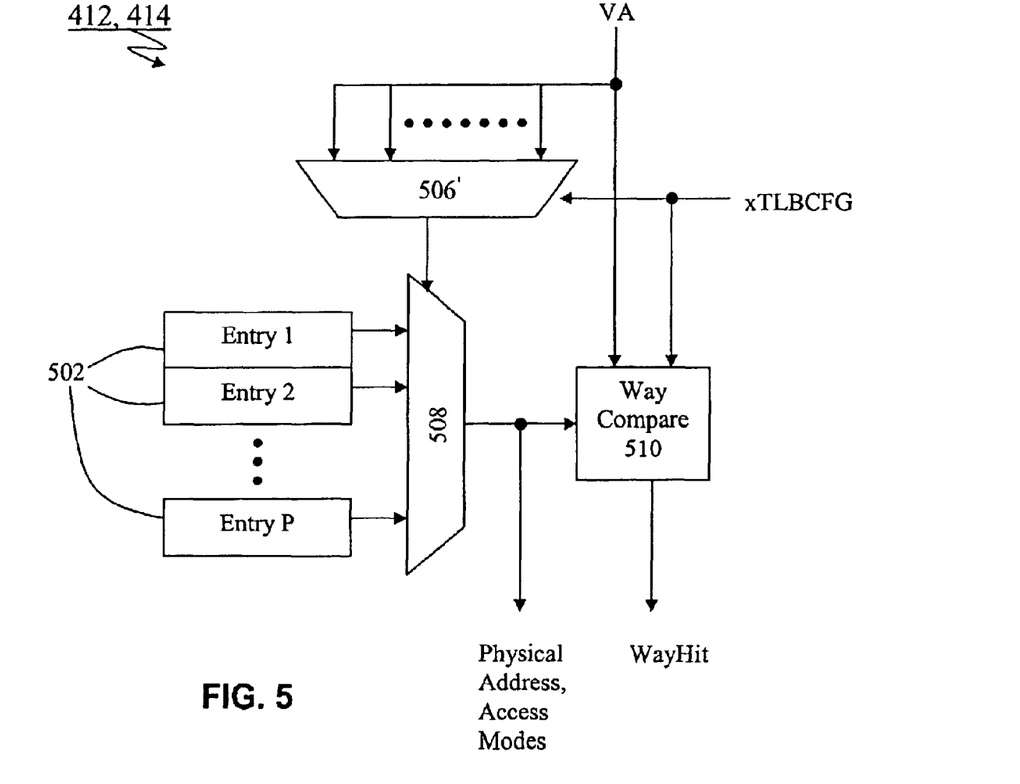
FIG. 5 is a block diagram illustrating an example of a TLB way configured in accordance with the invention.

FIG. 5 is a block diagram illustrating an example implementation of a TLB Way 412, 414 in accordance with the principles of the present invention.

As set forth above, the TLBs according to the invention can be configured with a configurable number N of ways 412, 414. Another feature of the invention is that each TLB can be configured to have "heterogeneous" ways. More particularly, in conventional set associative caches (including TLBs), all of the ways typically have the same structure, e.g., size. However, the TLB structure described herein allows the number of entries per way and the translated page size to differ for each way of the TLB.

Accordingly, each way 412, 414 can be configured separately according to a common set of parameters 308 supported by MMU design 316, such as the number of entries, page size(s), size restrictions, constant or variable VPN, and constant or variable PPN and access modes. It is the ability to specify constant translations in some or all of the ways that allows the TLBs according to the invention to smoothly span the range from a fixed memory map to a fully programmable one. Fully or partially constant entries can be converted to logic gates in the TLB at significantly lower cost than a run-time programmable way. Partially constant is, for example, where the VPN portions of a TLB are constant, whereas the PPNs are programmable.

For example, in an implementation where the desired page size is so large that only 8 pages covers the entire virtual and physical address space, the TLB can be configured to have 8 entries. In such an example, there is no point in programming the VPNs—there is already one entry per page and a TLB miss is impossible. However, the PPN can be programmable, thus making it possible to redirect multiple 512 MB regions to the same physical address. For example, one might map the bottom 512 MB of physical memory twice to two different virtual addresses (for example to both virtual address 0 and virtual address 512 M), with the only difference between them being that the TLB entry for one virtual address employs cached access modes and the TLB entry for the other employs uncached access modes.

In addition, even processors with generally programmable MMUs often have a few hardwired translations (e.g., MIPS' kseg0 and kseg1). The processor can represent these hardwired translations with its constant TLB entries. The processor actually requires a few constant TLB entries to provide translation in some circumstances, such as at reset and during exception handling.

More particularly, it is worth noting that exceptions can occur almost anywhere, and it is difficult for software to ensure that there is always a TLB entry ready to translate the addresses needed to service the exception. Rather than relying completely on the software to do this, a preferred embodiment provides that the exception vectors are located in pages that are statically mapped, i.e., all constant entries. This is particularly important for the Reset vector, which is where the processor starts when the system powers up or the reset button is pushed. The start of the Reset vector is the first instruction executed by the processor, so software has not been able to load up the TLBs yet.

Referring back to FIG. 5, each way 412, 416 consists of a configurable number P of entries 502, each of which maps, or translates, the address of one page from virtual to physical. As set forth above, according to an aspect of the invention, the page size to be translated may vary with each TLB way. With larger pages, fewer TLB refills occur from the page table in main memory because more virtual addresses can be translated by each TLB entry. However, software can lose flexibility in the allocation of memory. For example, if it has 100 kB to allocate, and it uses a 32 kB page size, then 4 pages are required, covering 128 kB of physical memory, so 28 kB is wasted. With 8 kB pages, 13 pages are required, covering 104 kB, so only 4 kB is wasted. However, more TLB entries 502 are needed to do the same amount of work. Most systems use 4 kB or 8 kB pages to balance the size of the page tables and the memory wasted by rounding up to the next multiple of a page size. However, 4 kB pages are undesirably small for mapping something like a frame buffer in graphics applications. For example, a 1600×1200 pixel image with 32 bits per pixel consumes 7.68 MB of memory, or 1875 4 kB pages. So, some processors provide multiple page sizes, so that 4 kB pages can be used for most things, while large pages can be used for specialized purposes.

As further shown in FIG. 5, virtual to physical address translation consists of searching each TLB way for an entry 502 that has a VPN that matches the corresponding most significant bits of the virtual address. More particularly, in this example implementation, the way virtual index mux 506 determines the particular TLB entry 502 to select for performing the match, based on the page size programmed to be translated by that way in configuration register xTLBCFG and the corresponding bits from the supplied virtual address. In this regard, it should be noted that the number of possible page sizes that can be translated by the particular way is determined by the configuration parameters selected for implementing that way.

The way entry selection mux 508 selects the contents of the entry to be matched in this way according to the index provided by way virtual index mux 506. The way compare logic 510 compares the appropriate bits in the virtual address with the corresponding VPN bits in the selected TLB entry 502. If the virtual address and the way's appropriate TLB entry match, the WayHit signal is raised and the virtual address bits can be replaced with the corresponding PA bits from the TLB entry 502. It should be recalled that the least significant bits of the address (i.e. the page offset) are identical between the virtual and physical addresses. For example, for a 4 kB page, the most significant 20 bits are translated, and the 12 least significant bits remain the same.

It should be noted that, in an alternative embodiment that will be described in more detail below, the TLB search can also include matching the Address Space Identifier (ASID) bits of the TLB entry to one of the current ASIDs stored in an RASID register.

TABLE 2 below lists an example set of configuration parameters 308 for specifying the generation of each way of a TLB.

TABLE 2

| Parameter | Description | Example Values |
| --- | --- | --- |
| AutoRefill | Whether this way can be refilled by a TLB miss | 0 or 1 (false or true) |
| IndexCount | Number of entries P in this way of TLB | 1, 2, 4, or 8 |
| PageSizes[1] | List of page sizes (i.e. bits from VA to use as page index) | Elements are 12 to VA |
| SizeRestrictionsBits[2] | Number of bits of size restriction in this way of TLB | 0 to 3 |
| VPNConst[3] | Whether the Virtual Page Number is constant or Writable | 0 or 1 (false or true) |
| VPNValues[3] | List of Virtual Page Number constants for each entry of the way | 32-bit value |
| PPNConst[3] | Whether the Physical Page Number is constant or writable | 0 or 1 (false or true) |
| PPNValues[3] | List of Physical Page Number constants for each entry of the way | 32-bit value |
| AccessModConst[3] | Whether the access modes are constant or writable | 0 or 1 (false or true) |
| AccessModeValues[3] | List of Access mode constants for each entry of the way | 32-bit value |

[1]For AutoRefill ways, this list must be subset of the PTEPageSizes parameter; the encoding used is that of PTEPageSizes.
[2]Parameters specified for Non-AutoRefill ways only; AutoRefill ways use the PTESizeRestrictionBits parameter.
[3]Parameters specified for Non-AutoRefill ways only; AutoRefill ways are always writable.

As seen above, in accordance with the variable page size (VPS) feature of the invention, each way 412, 414 of a TLB can be separately configured with a list of PageSizes (expressed as the number of bits in a page index). If the list has one element, the page size for that way is fixed. If the list has more than one element, the page size of the way may be varied at runtime via the ITLBCFG or DTLBCFG registers 416, 418. As noted above, each way can be programmed at run-time to one of the page sizes configured at processor definition. These registers are the means of programming the per-way page sizes. If a way is configured with only one page size, there is no run-time programmability. If configured with two or more pages, it is run-time programmable.

As an alternative to variable page sizes, each TLB way can be configured to have per-way SizeRestrictionBits. In other words, a way cannot have both variable page size and size restriction. Such entries translate from virtual to physical using their single configured page size, but after translation they check that the page index is within the bounds allowed by the size restriction field. This mechanism provides finer granularity over memory use in some situations. For example, with 3 size restriction bits configured and programmed to the value 4, the first ⅝-ths of the page are accessible, but accesses to the remainder cause an exception. This is described in greater detail in the aforementioned application Ser. No. 10/167,133 (TEN-011). Size restrictions do not affect the TLB search, and thus the restricted area of a page cannot be mapped elsewhere by another TLB entry (this would be a multiple entry match, which is illegal). The physical memory target, however, can be reused by other translations.

For example, suppose there is a TLB way with one entry and a 16 MB page size with 3 bits of size restriction. This TLB entry can be used to map, for example, the virtual addresses from 64 MB to 80 MB to physical addresses from 128 MB to 144 MB. Assume for example only 11 MB are really needed at this virtual address. The size restriction bits could be programmed to 5, making the first ⅝ths (12 MB at 64 MB to 76 MB virtual, 128 MB to 140 MB physical) accessible, and ⅜ths (4 MB at 76 MB to 80 MB virtual) take an exception on reference. Nothing else can be put at virtual addresses 76 MB to 80 MB; this would cause a TLB multi-hit. However, another TLB entry can be used to translate some other virtual address to use the physical memory from 140 MB to 144 MB.

To the extent not apparent from the descriptions above, an explanation of the parameters in TABLE 2 will become apparent in view of the detailed discussions hereinbelow of way components 506, 508 and 510, as well as example descriptions of entries 502.

It should be noted that, in connection with the hardware reset discussion above, the configuration of each TLB can further include specifications for ResetValues of various portions of way entries. This can be especially useful for smaller configurations. For example, where a TLB is configured to have a single way with 8 entries, and where only the PPN and access mode portions of the entries are writable, the PPN can be reset to match the VPN. The access modes can be reset so that they are all bypass. This allows the processor to come out of reset, find the reset vector translation, and access it as bypass (e.g. so that garbage data in the cache can be avoided). Once out of reset, the reset vector will not be accessed again, and the mapping and access modes can be changed.

Figure 6:
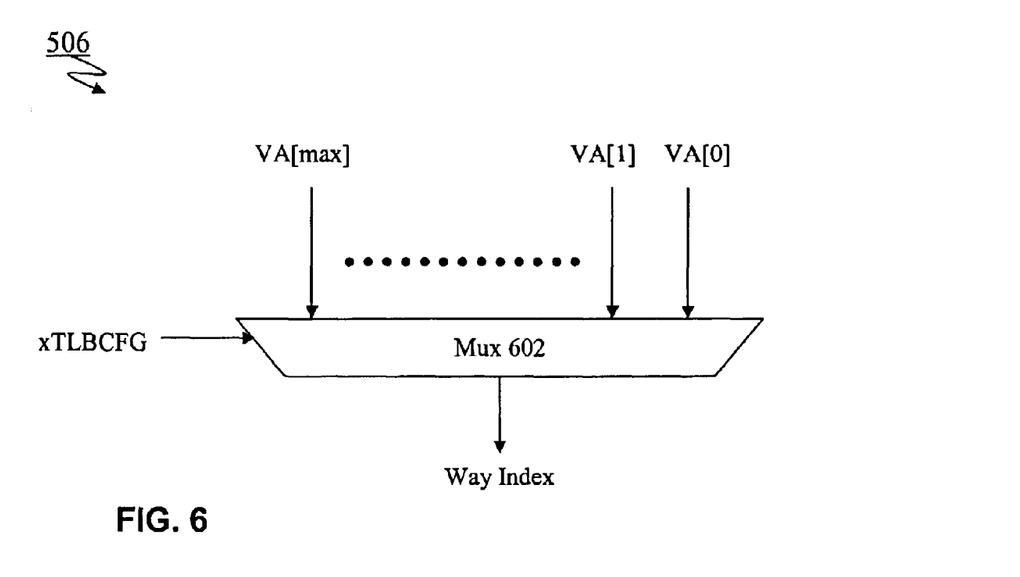
FIG. 6 is a block diagram of a way virtual index mux in accordance with an aspect of the invention.

FIG. 6 shows an example of way virtual index mux 506 in more detail. As shown in FIG. 6, way virtual index mux 506 includes a mux 602 that selects the appropriate virtual address bits to use as an index into the TLB way entries 502 based on the configuration and/or programmed values in xTLBCFG.

Recall that the number of bits not translated, i.e., the least significant address bits, is determined by the page size, which can be dynamically programmed from a set of configuration-specified values. These configuration-specified values may include the ITLBCFG (for the Instruction TLB) register 408 and DTLBCFG (for the Data TLB) register 410 parameters.

More particularly, if any way of the Instruction TLB is configured to support variable page sizes (VPS), then the ITLBCFG register 408 can specify the page size for each such way. In one example implementation, the 32-bit wide ITLBCFG register holds 8 such way page size specifications (i.e. the PageSizes parameter in TABLE 2), each specified in a debit field. The 4-bit field holds an index into the list of page sizes configured for that way. The operation of the processor is not defined if any index value is greater than or equal to the number of page sizes defined for its way.

Similarly but separately, if any way of the Data TLB is configured with variable page sizes, then the DTLBCFG register 410 can specify the page size for each such way. In an example implementation, the 32-bit wide DTLBCFG register holds 8 such way page size specifications, each specified in a 4-bit field. The 4-bit field holds an index into the list of page sizes configured for that way. The operation of the processor is not defined if any index value is greater than or equal to the number of page sizes defined for its way.

For example, referring to FIG. 5, assume way 412, 414 is configured to have 4 entries (i.e. IndexCount=4), and is capable of translating either 4 KB (i.e. 2^12) and 4 MB (i.e. 2^22) pages (as configured by parameter PageSizes, if the way is configured for variable page sizes (VPS)). Further assume that the xTLBCFG is currently programmed by the operating system such that the way will translate 4 KB pages. Because the way includes 4 (i.e. 2^2) entries, mux 602 will need to select 2 of the bits from the VA (i.e. 2 bits are needed to index 4 entries). In the 4 KB example, mux 602 would select bits 13:12 of the virtual address (i.e. VA[13:12]) to use as an index into entries 502 (VA[22:23] would be used in a 4 MB example). This way index can then be provided to way entry selection mux 508 to select the appropriate entry 502 for comparison. It should be noted that the particular hardware implementation of mux 602 (e.g. how many bits will be selected as a way index, or the number and size of the mux input and output legs) will be dependent on the number of entries configured for the way, and the number of page sizes the way is capable of translating.

Way entry selection mux 508 can be implemented by a multiplexer. The particular hardware implementation of mux 508 (e.g. the number and size of the mux input and output legs) will be dependent on the number of entries configured for the way (i.e. IndexCount parameter), and the size of entries 502. As should be apparent from above, mux 508 selects the way entry 502 in accordance with the virtual address supplied to the TLB, the page sizes configured for the way, and the current page size translation programmed in xTLBCFG. The selected entry 502 can then be provided to way compare logic 510 for comparison.

Figure 7:
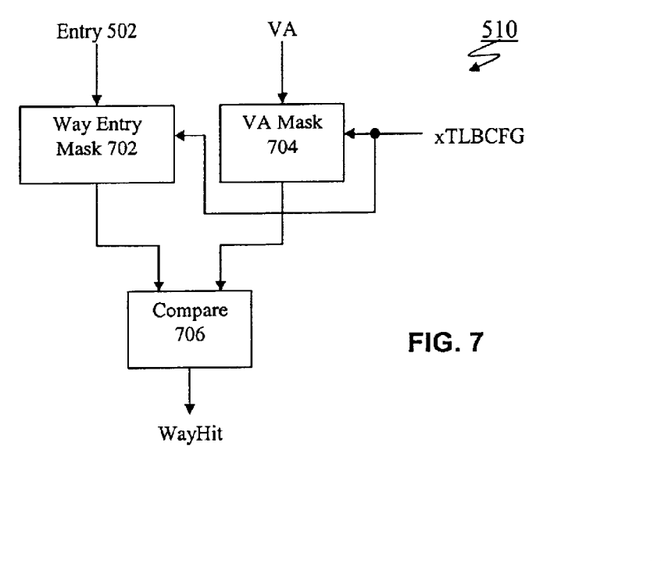
FIG. 7 is a block diagram of one example implementation of way compare logic in accordance with an aspect of the invention.

FIG. 7 shows an example of way compare logic 510 in more detail. As shown in FIG. 7, compare logic 510 includes a way entry mask 702 and a VA mask 704 for respectively masking and aligning the appropriate VPN bits from entry 502 and the virtual address in accordance with the page size programmed in xTLBCFG. Compare logic 510 further includes a comparator 706 for comparing between the two set of masked and aligned bits. Accordingly, if all bits match, the WayHit signal will be raised.

As an example, assume the virtual address is 32 bits, the number of entries in the way is 4, and the way is configured and/or programmed to translate 4 MB pages (i.e. 2^22). Accordingly, virtual address bits 21:0 will contain the page offset, and bits 23:22 will be used to select an index into entries 502. Virtual address bits 24 to 31 (i.e. VA[31:24]) will thus contain the remaining VPN bits of the desired page. The VA mask 704 will select and align these eight bits to compare with the appropriate bits in the VPN field in entry 502, as masked and aligned by mask 702. If the way is then re-programmed to translate 4 KB pages (i.e. 2^12) as reflected in appropriate bits in register xTLBCFG, then VA mask will select and align virtual address bits 14 to 31 (i.e. VA[31:14]) to obtain the 18 bit portion of the VPN for comparison with the selected entry 502.

Examples of the format of entries 502 will now be described in more detail. It should be noted that the format of entries 502 can be substantially similar to the format of entries in the page table, but this is not necessary.

As set forth above, generally, in addition to providing VPN to PPN translations, the TLB entry 502 can also provide some access mode bits for the page, including bits that determine the cache-ability of the page's data, whether or not writing to the page is permitted, etc.

Similar to any set-associative cache, each TLB entry consists of primarily two fields, tag and data. These fields can further include subfields. In one example, Tag consists of just the Virtual Page Number (VPN) subfield. In another example described in more detail below, the Tag further includes an ASID subfield. Data can consist of Physical Page Number (PPN), Size Restrictions (SR), Cache Attributes (CA), and Decay Bit (D) subfields. For some configurations of TLB entries, some of these fields may not exist, or only partially exist.

An example of the number of bits, and which bits in each particular field can be configured, is shown below in TABLE 3.

TABLE 3

| Field | Number of bits | Description |
|---|---|---|
| ASID | MMUASIDBits | ASIDs may exist with each entry in accordance with an alternative embodiment described in more detail below |
| VPN | xTlbVAddrBits - min (PageSizes)[1] - log2 (TlbWayNIndexCount) | The VPN is only compared against the page bits that this particular way is configured to translate. Note that the bits which index the way are inherently "compared" by the nature of a lookup in the way. |
| PPN | xTlbpAddrBits - minPageSize* | All the pages physical address bits must be available for translation. |
| SR | srBits[1] | Size Restriction bits can be specified in an example implementation mentioned above |
| CA | Log2 (MMUAttrMap) | Cache Attributes (i.e. Access Modes) are configurable, and the minimum encoded representation can be stored. |
| D | decayBit | The bit is needed only if AutoRefill is specified for the way, and a replacement algorithm such as that described in co-pending application TEN-011 is employed. |

[1]These are based on whether or not a way is AutoRefill (and gets its contents from hardware initiated loads to the page table) as follows:
if (AutoRefill(TlbWay)) {
  minPagesize = min (MMUPTEPageSizes)
  srBits = MMUPTESRBits
  decayBit = 1
} else {
  minPageSize = min(PageSizes(TlbWay))
  srBits = TlbWayNSRBits
  decayBit = 0
}

A significant number of storage elements can be saved by using "static mapping" throughout. As shown in TABLE 2, ways can be configured to be VPN, PPN and/or Access Mode (i.e. CA) "Const" and lists of such constant values can be configured in the corresponding "Values" parameters. Aside from the obvious savings of latch or flip-flop storage elements, most synthesis tools will optimize logic that contains constants. For example, an AND gate with input IN and input 1'b0 would be optimized away since its output would always be 1'b0. This will optimize out further downstream logic. For these two reasons, the area savings of statically configured TLB entries can be significant.

Suppose a TLB way is configured with PageSizes=(29) (i.e., 512 MB pages), xTlbVAddrBits=32, xTlbPAddrBits=32, AutoRefill=0, and IndexCount=4. Also, assume that there are 4 CA bits, which is typical. Each TLB entry 502 would thus consist of 1 VPN bit, 3 PPN bits, 0 SR bits, 4 CA bits, and no D bit for a total of 8 bits. This will require 8 latches or flip-flops to implement a single entry for this way, and 32 (8*4 indices) storage elements to implement the way.

As set forth above, in addition to address translation, both Page Table Entries (PTEs) and TLB entries store access mode bits that control whether and how the processor accesses memory. The same encoding can be used for the access mode bits in PTEs and the access mode bits in TLB entries. PTEs are automatically written by the hardware into AutoRefill entries of the TLB, so the formats between PTEs and "raw" TLB entries are preferably similar.

The potential number of access modes required by systems can be large. To encode all the modes required by any potential system would make this field too big to fit into a 4-byte PTE. However, the subset of values required for any particular system are usually much smaller. Therefore, the present invention allows the system designer to encode the appropriate values via three configuration parameters, one for instruction fetch, one for loads, and one for stores. The number of bits required by the access modes is the $\log_2$ of the number of entries in the configuration parameters, with each entry specifying a set of attributes. One example of the possible attributes is set forth in TABLE 4. Not all attributes need be supported by every implementation.

TABLE 4

| Attribute | Description | Used by |
| --- | --- | --- |
| Invalid | Exception on access | Fetch, Load, Store |
| Isolate | Read/write cache contents regardless of tag compare | Fetch, Load, Store |
| Bypass | Ignore cache contents regardless of tag compare - always access memory for this page | Fetch, Load, Store |
| No-allocate | Do not refill cache on miss | Fetch, Load, Store |
| Write-through | Write memory in addition to DataCache | Store |
| Guarded[1] | Do not read from this page except when required by the program (i.e. speculative references to reduce latency are not allowed) | Load[2] |
| Coherent[1] | Maintain cache coherency for this page | Fetch, Load, Store |
| Prefetch[1] | Allow hardware prefetch for this page | Fetch, Load, Store |
| Streaming[1] | Cache only for data locality, not temporal locality | Fetch, Load, Store |

[1]This attribute may not necessarily be supported.
[2]In a preferred implementation, Instruction fetch is always non-guarded. Stores are always guarded.

The assignment of attributes to the access mode field of PTEs may be done with only one encoding for each distinct attribute set, or in such a way that each attribute has its own bit, or anything in between. Often, single bits are used for a valid bit and a write-enable bit. For a valid bit, all of the access mode values with this bit zero would specify the Invalid attribute so that any access causes a InstFetchProhibitedCause, LoadProhibitedCause, or StoreProhibitedCause exception, depending on the type of access. Similarly for an operating system page write enable bit, an unwritable page would specify the Invalid attribute to cause a StoreProhibitedCause exception on any store.

For systems that implement demand paging, i.e., where a page frame is not fetched from disk to RAM until it is actually needed, it is advantageous to have a page dirty bit to indicate that the page has been modified and must be written back to disk if it is replaced. This is implemented by creating a write-enable bit, and using it as the per-page dirty bit as in the MIPS architecture.

Older MMUs had two additional PTE bits: writable and dirty. On a store, the hardware would take an exception if the target page was not writable. If it were writable and the dirty bit was clear, the hardware would turn on the dirty bit in the page table in memory. This clean to dirty transition is fairly rare—10–100 times per second—so it is rather inefficient to have the hardware handling it. MIPS decided to do this in software to simplify the hardware. There is only one bit which the hardware knows about. This bit, if clear, causes an exception on any store. The software keeps a software bit in the PTE that indicates whether the page is writable or not. On the exception, it checks this bit; if it is clear then the write is in error. If it is set, then it sets the hardware bit in both the memory page table and the TLB and returns. Thus, the hardware bit is effectively a dirty bit, but the hardware never modifies it.

As will be described in more detail below, the first write to a clean (non-dirty) page can cause a StoreProhibitedCause exception. The exception handler checks one of the software bits labeled "software" which indicates whether the page is really writeable or not; if it is, it then sets the hardware write-enable bit in both the TLB and the page table, and continues execution.

An alternative embodiment of the MMU that can be configured to further specify consideration of address space identifiers (ASIDs) will now be described in more detail. As explained above, this can be implemented by allowing entries 502 to be configured to have tags that include ASID subfields in addition to VPN subfields.

Figure 8:
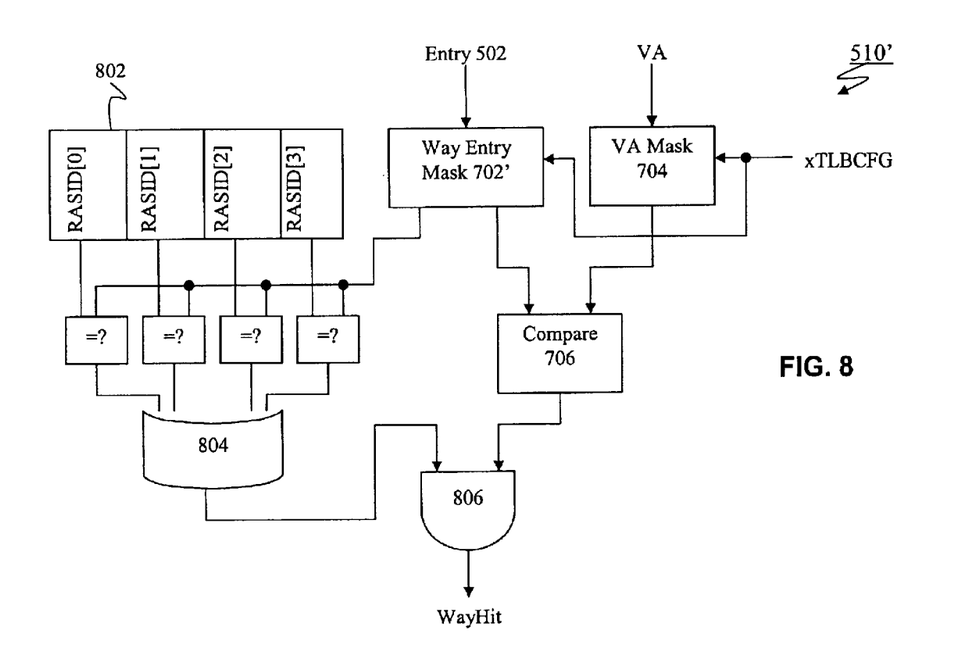
FIG. 8 is a block diagram of one alternative implementation of way compare logic in accordance with an aspect of the invention.

First, consider the alternative embodiment of way compare logic 510' illustrated in FIG. 8. As shown in this example, compare logic 510' further includes a Ring ASID register 802 that allows a plurality of ASIDs to be dynamically programmed in accordance with protection or other access schemes that will be described in more detail below. Each ASID in register 802 is compared with the ASID subfield of selected entry 502 (as extracted by mask 702'). If any of the ASIDs matches the ASID subfield, this is provided to AND gate 806 to further control the generation of the WayHit signal.

Accordingly, in this embodiment, the virtual address input to the TLBs is effectively concatenated with an Address Space Identifier (ASID) specified in a processor register to control memory access for a programmed instruction fetch, load, or store address calculation. Generally, ASIDs allow software to change the address space seen by the processor (e.g., on a context switch) with a simple register write without changing the TLB contents. The TLB stores an ASID with each entry, and so can simultaneously hold translations for multiple address spaces.

More particularly, suppose a processor is executing a process C with a particular virtual to physical memory map, and it is desired to switch to executing process D, which has a different virtual to physical memory map. Switching the page table is not enough, because some of C's PTEs are still stored in the TLBs. It might be possible to change the page table and flush both TLBs to effect the switch. However, flushing the TLBs on a context switch slows down switching. So, a technique has been developed in the art in which all of the TLB entries store both an ASID and a VPN. The VPN has to equal the virtual address and the ASID has to equal the value in a processor register for a given TLB entry to hit. Now, when the processor switches from process C to process D, all that needs to be changed is the ASID value in the processor register and all of C's entries in the TLB will be ignored. When process D switches back to process C, the register is changed back again. If any of C's PTEs are still cached in the TLB they will become active again and D's will be ignored.

In accordance with an aspect of the invention, the number of ASID bits is configurable. ASIDs are also an integral part of protection, as they are used to specify the accessibility of memory by the processor at different privilege levels, as described in more detail below. It should be noted that, unlike other processors, the TLBs need not have a separate valid bit in each entry. Instead of a valid bit a processor in the preferred embodiment uses a reserved ASID value of 0 to indicate an invalid entry. This can be viewed as saving a bit, or as almost doubling the number of ASIDs for the same number of hardware bits stored in a TLB entry.

An example of protection schemes that can be implemented with the RASID register 802 will now be described in more detail. This register, and the desired protection schemes can be configured by the further specification of the parameters listed in TABLE 5 below according to one example of the invention.

TABLE 5

| Parameter | Description | Example Value |
|---|---|---|
| MMUASIDBits | Number of ASID bits (i.e. Processor supports 2^MMUASIDBits-1 Address Spaces | 0 |
| MMURingCount | Number of Rings supported by MMU | 1 |
| MMUInvalidASID | ASID reserved to signal an invalid TLB entry | 0 |
| MMUKernelASID | ASID reserved for kernel or ring level 0 | 1 |

Many processors implement two levels of privilege, often call "kernel" and "user," so that the most privileged code need not depend on the correctness of less privileged code. The operating system kernel has access to the entire processor (state and instructions), but disables access to certain features when running application code to prevent the application from accessing or interrupting the kernel or other applications. This mechanism facilitates debugging and improves system reliability.

Some processors implement multiple levels of decreasing privilege, called rings, often with elaborate mechanisms for switching between rings. Such an embodiment provides a configurable number of rings (RingCount), but without the elaborate ring-to-ring transition mechanisms. When configured with 2 rings, it provides the common kernel/user modes of operation, with ring 0 being kernel and ring 1 being user. With 3 or 4 rings configured, the configurable processor provides the same functionality as more advanced processors, but with the requirement that ring-to-ring transitions be provided by ring 0 (kernel) software.

In other words, there should be a way for the process to switch from one level of privilege to another. For example, in the simplest 2 ring system there should be a way for ring 1 (user code) to request the services of ring 0 (the kernel). In most processors (including the preferred embodiment of the present invention), this is done by taking an exception. Some processors that have 2 rings allow direct transitions from one ring to a lower ring.

Further, the processor might be executing ring 3 code and want to call on the services of code that executes at the ring 1 privilege. A preferred embodiment of the present invention does not do this. Rather, it uses an exception to get from ring 3 to ring 0, and then has the exception handler switch back to ring 1. This is because there is a lot of complicated checking that needs to be done when moving to a higher privilege (i.e., lower ring number), and it is better to put this checking in software rather than hardware.

With RingCount=1, the processor has a single level of privilege, and all instructions are always available. With RingCount>1, software executing with CRING=0 (denoting ring 0) is able to execute all instructions; other rings may only execute non-privileged instructions. The only distinction between the rings greater than 0 are those created by software in the virtual to physical translations in the Page Table.

The name "ring" is derived from an accessibility diagram for a single process. At ring 0 (that is, when CRING=0), the processor can access all of the current process' pages (i.e., ring 0 to RingCount–1 pages). At ring 1 it can access all ring 1 to RingCount–1 pages. Thus, when the processor is executing with ring 1 privileges, its address space is a subset of that at ring 0 privilege. This concentric nesting of privilege levels continues to ring RingCount–1, which can access only pages belonging to ring RingCount–1.

It is illegal for two or more TLB entries to have the same virtual address, even if they are at different ring levels. In other words, one ring's mapping cannot not override another's. Systems that require only traditional kernel/user privilege levels can, of course, configure RingCount to be 2. However, rings can also be useful for sharing. Many operating systems implement the notion of multiple threads sharing an address space, except for a number of per-thread pages. Such a system could use ring 0 for the shared kernel address space, ring 1 for per-process kernel address space, ring 2 for shared application address space, and ring 3 for per-thread application address space.

Each ring has its own Address Space Identifier (ASID). The Ring ASID (RASID) register holds the current ASIDs for each ring in configurations with RingCount>1 (the register does not exist when RingCount=1) In one example of the invention, the register is divided into four 8-bit sections, one for each ASID. Thus, 8-ASIDBits are unused in each 8-bit section of the RASID register. The Ring 0 ASID is hardwired to 1, and unused ASIDs are hardwired to 0. The operation of the processor is undefined if any two of the RingCount ASIDs are equal.

Ring 0's ASID is hardwired to 1. The ASIDs for rings 1 to RingCount–1 are specified in the RASID register. The ASIDs for each ring in RASID must be different. Each ASID has a single ring level, though there may be many ASIDs at the same ring level (except ring 0). This allows nested privileges with sharing.

The ring number of a page is not stored in the TLB; only the ASID is stored. When a TLB is searched for a virtual address match, the ASIDs of all rings specified in RASH) are tried. The position of the matching ASID in RASID gives the ring number of the page. If the page's ring number is less than the processor's current ring number (CRING), then the access is denied with an exception (either InstFetchPrivilegeCause or LoadStorePrivilegeCause, as appropriate).

An alternative implementation would store the ring number of the page in the TLB, and then use a single ASID for all rings, instead of having an ASID per ring. However, the former allows sharing of TLB entries, while the alternative does not. For example, it is often desirable to reuse the same TLB entries for all kernel-mapped addresses, instead of having the same PTEs loaded into the TLB with different ASIDs. The MIPS MMU added a G (global) bit in the TLB to ignore the ASID match for this reason. The invention's mechanism is more general in that it allows finer granularity, not just all or nothing as in the MIPS solution.

The kernel typically assigns ASIDs dynamically as it runs code in different address spaces. When no more ASIDs are available for a new address space, the kernel flushes the Instruction and Data TLBs, and begins assigning ASIDs anew. For example, with ASIDBits=8 and RingCount=2, a TLB flush occurs at most every 254 context switches, if every context switch is to a new address space. This is because $254=2^{ASIDBits}-1$ (for 0 being InvalidASID)−1 (for 1 being Kernel ASID).

An example of TLB refill management schemes in accordance with an invention will now be described in more detail.

More particularly, when no TLB entry matches the ASIDs and the virtual address presented to the MMU, and the TLB is configured with one or more AutoRefill ways, the MMU attempts to automatically load the appropriate Page Table Entry (PTE) from the Page Table and write it into the TLB in one of the AutoRefill ways. This hardware generated load is from the Page Table itself and requires virtual to physical address translation. Preferably, the virtual to physical address translation executes at ring 0 so that it has access to the page table. If this second translation fails to find a matching TLB entry, then the processor takes an InstTLB-MissCause or LoadStoreTLBMissCause exception as appropriate, and the exception handler must complete the refill by using the w(I, D] TLB instructions to put the required PTE into the TLB as described herein.

This combination of hardware and software refill gives excellent performance while minimizing processor complexity. If the second translation succeeds, the PTE load is done via normal load mechanisms. The PTE's Ring field is then used as an index into the RASID register, and the resulting ASID is written together with the rest of the PTE into the TLB.

The TLB refill mechanism requires the page table for the current address space to reside in the current virtual address space. The base address of the Page Table is given by the PTEBase field of the PTEVADDR register. On a TLB miss, the virtual address of the PTE is formed by concatenating PTEVADDR, PTEBase, the Virtual Page Number (VPN) bits of the miss virtual address, and 2 or 3 zero bits (for 4 byte or 8 byte PTEs). The bits used from PTEVADDR and from the virtual address are configuration dependent; the exact calculation is $$PTEVADDR_{VABITS-1 \ldots (VABITS-PMINBITS+2)}$$
$$\|vAddr_{VABITS-1 \ldots PMINBITS}\|2'b00 \text{ for 4 byte PTEs, and}$$
$$PTEVADDR_{VABITS-1 \ldots (VABITS-PMINBITS+3)}$$
$$\|vAddr_{VABITS-1 \ldots PMINBITS}\|3'b00$$

for 8 byte PTEs, where PMINBITS is the $\log_2$ of the minimum PTE page size in bytes (i.e., the minimum element of configuration parameter PTEPageSizes). When multiple page sizes are configured for AutoRefill ways, pages larger than the minimum size require multiple copies of the same PTE to be stored in the page table so that the PTE refill works regardless of where in the page the miss occurs.

Referring back to FIG. 4, generally, control logic 408 is responsible for controlling all of the TLBways. For example, the control logic will determine:

1. TLB Hit/Miss
2. All Exceptions
3. Way Write Enables based on either instruction directed writes (i.e., WxTLB, IxTLB) or from Replacement Algorithm for AutoRefills (see above).

Since logic external to the MMU will prioritize any exception above instruction completion, a TLB hit can simply be detected by performing an OR of the WayHit signals generated by each of the ways. Note that multiple ways could hit, or privilege violations could have occurred, but these exceptions will preempt any instruction completion; therefore, since determining TLB hit is a timing critical signal in system where the caches are tagged with a physical address, it is beneficial to not include these conditions in determining TLB hit.

As mentioned above, it is illegal for more than one TLB entry to have the same virtual address. Software is responsible for making sure the address range of all TLB entries never overlap. However, it is possible that a software error could result in an attempt to write two or more TLB entries that both match a given virtual address. To help debug such software, the MultiHit exception is provided for when the same virtual address translates to more than one physical address (it would be better to do this when the TLB is written than when it is accessed, but it is easier to perform when it is accessed).

A Multiple Hit exception is generated from simply ANDing all possible two way combinations, and feeding these into an OR tree. For instance, for N ways, the equation would be MultiHitException=(way0Hit && way1Hit)∥(way0Hit && way2Hit)∥ . . . ∥(way0Hit && wayNHit)∥(way1Hit && way2Hit)∥(way1Hit && way3Hit)∥ . . . ∥(way1Hit && wayNHit)∥ . . . ∥(way<N−1>Hit && wayNHit). This completely covers two or more ways of the TLB hitting.

A Miss Exception is generated if None of the TLB ways detected a hit. For instance, for N ways, a the equation would be MissException=!way0Hit && !way1Hit && . . . && !way2Hit).

If Size Restrictions are configured, this exception is determined by comparing the SR bits against the most significant page offset bits. For instance, if a 4K page is translated, and 3 Size Restriction bits are configured, SizeRestrictionException=SR>PA[11:9].

A Privilege Exception is generated when the TLB hits; however, the entry which hit does not have privilege based on the Current Ring (CRING) of the machine. For instance, if the CRING is set to 2, and the ASID matched RASID[0], this exception would be taken. The equation for R rings is PrivilegeException=(ring0Hit && (CRING>0))∥(ring1Hit && (CRING>1))∥(ring2Hit && (CRING>2)). Note that ring 3 is not needed, since it is the lowest ring, and access to it will always be granted.

The way write enables can come directly from an instruction that specifies the way and entry to be written, or from the replacement algorithm (U.S. patent application Ser. No. 10/167,133 (TEN-011)), in the case of AutoRefill, and are needed to update the appropriate TLB field. Note that each way is responsible for decoding the appropriate entry to write from the index given through the VA. The way write enables are split up into ASIDWriteEnable, EntryWriteEnable, and DecayWriteEnable. This is used both to implement correct functionality as well as an optimization to save power. ASIDs need to be updated for any TLB write or invalidation. The "entry," which consists of VPN, PPN, SR, and CA, needs to only be written on a TLB write. The Decay bit needs to be updated on every TLB access. Therefore:

ASIDwriteEnable=(IxTLB ∥ WxTLB ∥ autoRefillWxTLB) && wayDecode

EntryWriteEnable=(WxTLB ∥ autoRefillWxTLB) && wayDecode

DecayWriteEnable=Load ∥ Store # For DataTLB

DecayWriteEnable=Fetch # For InstructionTLB

According to one aspect, the configurable MMU of the invention is useful in conjunction with a configurable processor such as the Xtensa processor provided by Tensilica, Inc. of Santa Clara, Calif.

Figure 9:
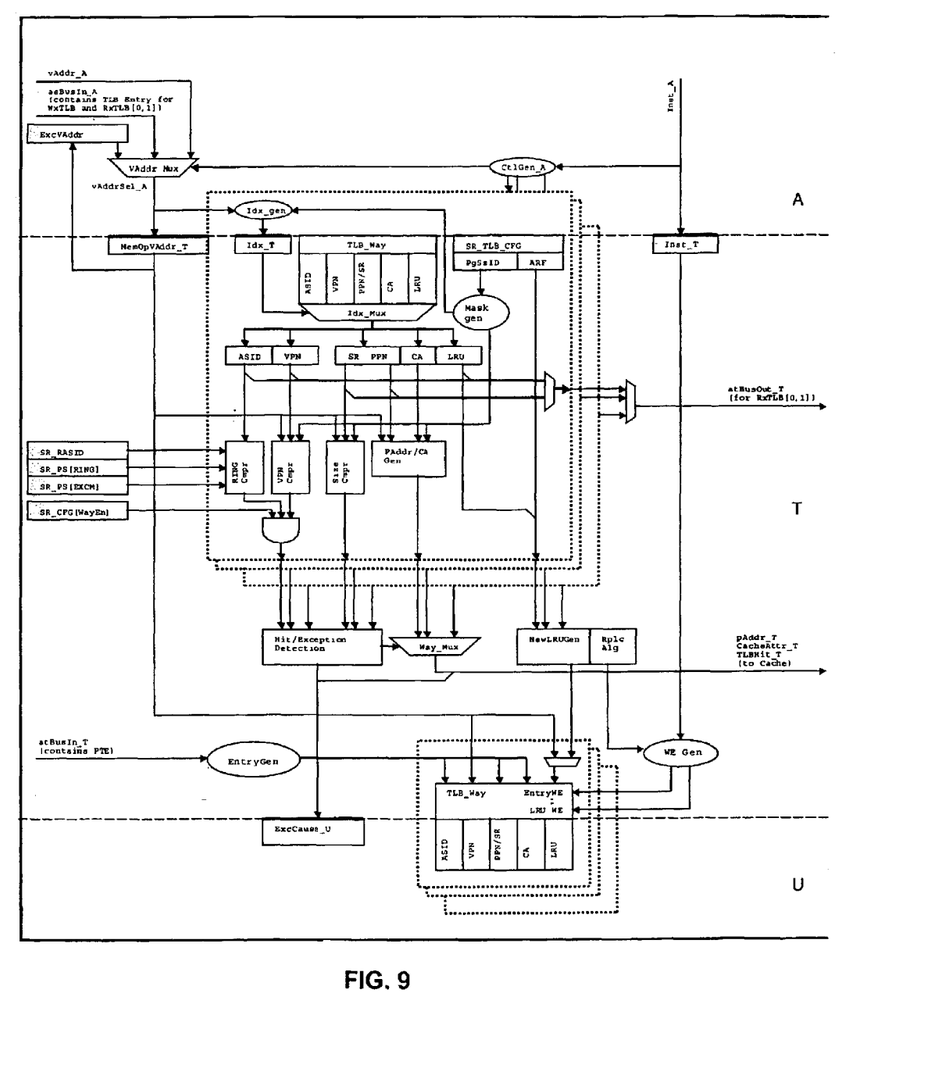
FIG. 9 is a block diagram illustrating how an example of a configurable MMU can be integrated in a configurable processor in accordance with an aspect of the invention.

FIG. 9 shows how the TLBs of the present invention can be implemented in the overall Xtensa pipeline. As mentioned above, and as can be seen in FIG. 9, the TLBs in a preferred embodiment operate using three pipelined cycles.

The Address (A) cycle is when the virtual address is presented to the TLB. The Translation (T) cycle is where the TLB performs all of its lookup, comparisons, and exception detection. The Update (U) cycle is when any values that need to be written to the TLB are actually updated.

Referring to FIG. 9, and the discussions above, TABLE 6 below shows the DTLB pipeline, its ties to the Xtensa pipeline, and the MMU related activities that are going on for each of the operations.

TABLE 6

| DTLB Operations | 0 | 1 | 2 | 3 | 4 | Comments |
|---|---|---|---|---|---|---|
| Translate (i.e. Load/Store) | I | R | E | M | W | |
| DTLB pipe flow | | | A | T | U | |
| Vaddr given to DTLB | | ⊢⊣ | | | | |
| Translation to pAddr & access modes | | | | ⊢⊣ | | |
| Decay Updated | | | | ⊢⊣ | | |
| Writing DTLB | | | A | T | U | |
| VPN given to DTLB | | ⊢⊣ | | | | |
| PTE converted to TLB entry | | | | ⊢⊣ | | |
| Entry and way to write determination | | | | | | |
| DTLB Entry is updated, *No decay update | | | | | ⊢⊣ | No Decay Update |
| Read | | | A | T | U | |
| Way and index given to DTLB | | ⊢⊣ | | | | |
| DTLB outputs contents of appropriate entry | | | | ⊢⊣ | | |
| | | | | | | No Decay Update |

TABLE 7 shows an example of the ITLB pipeline, its ties to the Xtensa pipeline, and the MMU related activities that are going on for each of the operations.

TABLE 7

| ITLB Operations | 0 | 1 | 2 | 3 | 4 | 5 | Comments |
|---|---|---|---|---|---|---|---|
| Translate (i.e. Ifetch) | P | I | R | E | M | W | |
| ITLB translate | A | T | U | | | | |
| Vaddr given to ITLB | ⊢⊣ | | | | | | |
| Translation to pAddr & access modes | | ⊢⊣ | | | | | |
| Decay Updated | | | ⊢⊣ | | | | |
| Writing ITLB | | | | A | T | U | |
| VPN given to DTLB | | | ⊢⊣ | | | | |
| PTE converted to ITLB entry. | | | | ⊢⊣ | | | |
| Entry and way to write determination | | | | | | | |
| ITLB Entry is updated | | | | | ⊢⊣ | | No Decay Update |
| Read ITLB | | | | A | T | U | |
| Way and index given to ITLB | | | ⊢⊣ | | | | |
| ITLB outputs contents of appropriate entry | | | | ⊢⊣ | | | |
| | | | | | | | No Decay Update |

The preferred embodiments described above have been presented for purposes of explanation only, and the present invention should not be construed to be so limited. Variations on the present invention will become readily apparent to those skilled in the art after reading this description, and the present invention and appended claims are intended to encompass such variations as well.

What is claimed is:

1. A system for specifying a memory management unit (MMU) for a processor, the system comprising:

an MMU design having an associated set of configuration parameters, the configuration parameters having a range of predetermined values;

a user interface program that allows a designer to view the configuration parameters and to specify values of the parameters for a desired MMU; and a MMU build program that generates a configured MMU based on the specified values of the configuration parameters, and the MMU design.

2. A system according to claim 1, wherein at least one set of values for the configuration parameters provides the configured MMU in accordance with a static memory model and at least one other set of values for the configuration parameters provides the configured MMU in accordance with a dynamic memory model.

3. A system according to claim 2, wherein the at least one set of values is suitable for an embedded processor.

4. A system according to claim 2, wherein the at least one other set of values is suitable for a general purpose processor.

5. A system according to claim 1, wherein the sets of values specify different page sizes.

6. A system according to claim 1, wherein the sets of values specify multiple protection or sharing rings.

7. A system according to claim 1, wherein the configuration parameters include values for specifying one or more of variable page sizes, rings, demand paging and hardware table refill.

8. A system according to claim 1, wherein the configuration parameters allow the configured MMU to include a prioritized ring system, the ring system including an exception handler to execute code at different priority levels.

9. A system according to claim 1, wherein the configuration parameters allow the configured MMU to implement a ring system, the ring system including all address space identifier (ASID) associated with each ring therein.

10. A system according to claim 1, wherein the MMU design includes HDL embedded in Perl code.

11. A system according to claim 10, wherein the MMU build program includes a Perl processor and the configured MMU comprises HDL.

12. A system according to claim 1, wherein the configuration parameters include a number of TLB ways.

13. A system according to claim 12, wherein certain of the TLB ways can translate different page sizes.

14. A system according to claim 1, wherein an Instruction TLB can be specified using one set of values of the configuration parameters, and a Data TLB can be specified using another set of the values of the configuration parameters, the Instruction TLB and Data TLB comprising the configured MMU.

15. A system according to claim 1, wherein the configuration parameters include a configurable number of TLB ways.

16. A system according to claim 15, wherein certain of the TLB ways can translate different page sizes.

17. A method for specifying a memory management unit (MMU) for a processor, the method comprising:

providing an MMU design having an associated set of configuration parameters, the configuration parameters having a range of predetermined values;

allowing a designer to view the configuration parameters and to specify values of the parameters for a desired MMU; and generating a configured MMU based on the specified values of the configuration parameters, and the MMU design.

18. A method according to claim 17, wherein at least one set of values for the configuration parameters provides the configured MMU in accordance with a static memory model and at least one other set of values for the configuration parameters provides the configured MMU in accordance with a dynamic memory model.

19. A method according to claim 18, wherein the at least one set of values is suitable for an embedded processor.

20. A method according to claim 18, wherein the at least one other set of values is suitable for a general purpose processor.

21. A method according to claim 17, wherein the sets of values specify different page sizes.

22. A method according to claim 17, wherein the sets of values specify multiple protection or sharing rings.

23. A method according to claim 17, wherein the configuration parameters include values for specifying one or more of variable page sizes, rings, demand paging and hardware table refill.

24. A method according to claim 17, wherein the configuration parameters allow the configured MMU to include a prioritized ring system, the ring system including an exception handler to execute code at different priority levels.

25. A method according to claim 17, wherein the configuration parameters allow the configured MMU to implement a ring system, the ring system including an address space identifier (ASID) associated with each ring therein.

26. A method according to claim 17, wherein the MMU design includes HDL embedded in Perl code.

27. A method according to claim 26, wherein generating the configured MMU includes processing the Perl code and the configured MMU comprises HDL.

28. A method according to claim 17, wherein the configuration parameters include a number of TLB ways.

29. A method according to claim 28, wherein certain of the TLB ways can translate different page sizes.

30. A method according to claim 17, wherein an Instruction TLB can be specified using one set of values of the configuration parameters, and a Data TLB can be specified using another set of the values of the configuration parameters, the Instruction TLB and Data TLB comprising the configured MMU.

31. A method according to claim 17, wherein the configuration parameters include a configurable number of TLB ways.

32. A method according to claim 31, wherein certain of the TLB ways can translate different page sizes.

33. A method for specifying a memory management unit (MMU) for a processor, the method comprising the steps of:

selecting configuration values wherein the configuration values specify desired MMU options including MMU management options, MMU functionality options, and one or more translation lookaside buffers (TLB);

specifying default configuration values for certain of the desired MMU options; and generating a hardware description of the MMU based on the selected and default configuration values.

34. The method according to claim 33, where the step of generating a hardware description includes:

representing the selected and default configuration parameters in a Perl data structure;

constructing a Perl program to represent the MMU where the Perl program contains embedded hardware description language; and executing the Perl program based on the contents of the Perl data structure.

* * * * *